Feb. 26, 1924.
J. PERRET ET AL
1,485,288
ALTERNATING CURRENT MOTOR GROUP
Filed Jan. 16, 1922
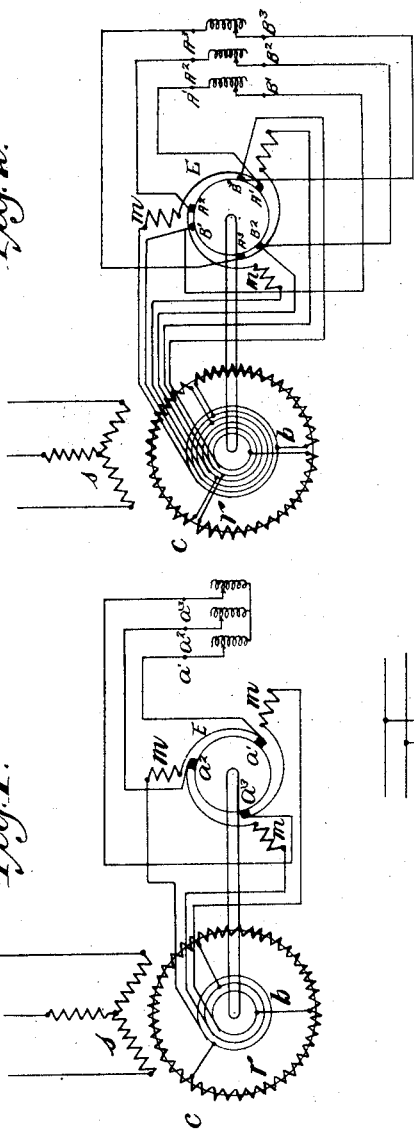
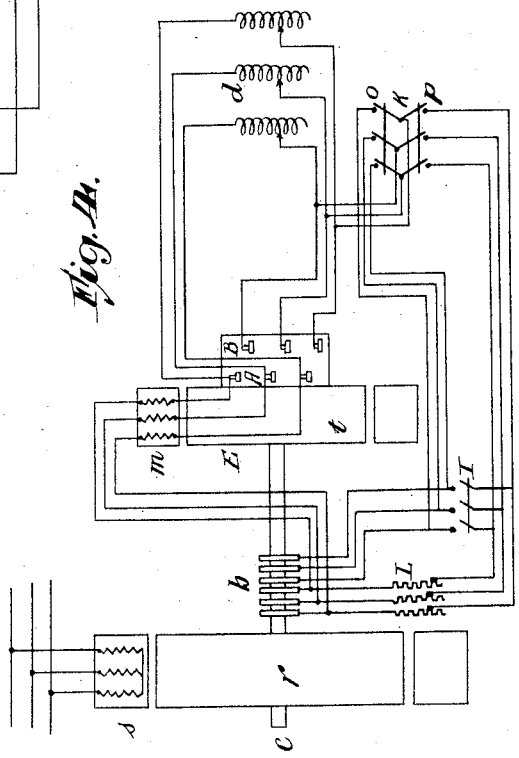
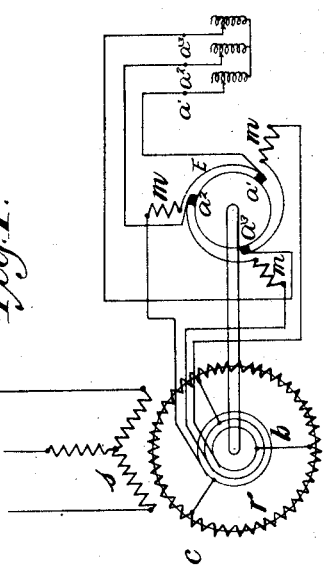
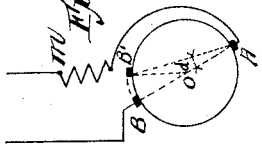

Patented Feb. 26, 1924.

1,485,288

UNITED STATES PATENT OFFICE.

JOSEPH PERRET AND LÉON OTS, OF PARIS, FRANCE, ASSIGNORS TO FORGES & ATELIERS DE CONSTRUCTIONS ELECTRIQUES DE JEUMONT, OF PARIS, FRANCE.

ALTERNATING-CURRENT MOTOR GROUP.

Application filed January 16, 1922. Serial No. 529,659.

*To all whom it may concern:*

Be it known that we, JOSEPH PERRET and LÉON OTS, citizens of the Republic of France, both residing in Paris, in the Republic of France, have invented certain new and useful Improvements in Alternating-Current Motor Groups, of which the following is a specification.

This invention relates to improvements in the regulation of alternating current motor groups.

For controlling machines such as rolling mills by alternating current motors, it is generally necessary to provide a certain speed variation as much for the regulation of the power absorbed by a dynamic flywheel as to satisfy the various requirements of the work. That is to say the machines ought to have several speeds and also variable characteristics according to the particular case.

The regulation of the speed by a commutating motor is adapted for this purpose; in large rolling mills a particularly good method consists in employing not a motor having direct commutation but a combination of a commutating motor in cascade with an asynchronous motor. These combinations are well known, and various systems have already been proposed for varying the speed and obtaining suitable regulation.

The series motor, connected in cascade with the asynchronous motor forms fundamentally the simplest solution. The rôle of the series motor is principally that of an ohmic resistance and the magnitude of this resistance is determined by the angular position of the brushes; thus by varying the position of the brushes the controlling speed of the group may be varied, for the same reason that the speed of an asynchronous motor varies when the rotor resistance is varied.

Without any other arrangement the system would however always have a constant speed when running light which speed approximates to the speed of synchronism of the asynchronous motor; in other words the slip of the group would alone be regulatable.

In addition to this disadvantage, the regulation or the speed under load by the ordinary means of displacing the brushes would modify to an annoying extent the power factor of the motor, that is to say that the value cos. $\emptyset$ would be variable not only according to the load but also according to the speed.

This invention has for its object, in its application to a group of this type:

1. To allow of a regulation of the speed when running light whilst regulating at will the rate of slip.

2. To obtain under all conditions of load a high power factor.

It further relates to the particular means for the starting and electric braking of the group.

Figure 1 shows an asynchronous motor group having a series of commutating motor in cascade therewith arranged in the ordinary manner;

Fig. 2 shows diagrammatically an analogous group to that of Fig. 1 arranged in accordance with the present invention;

Fig. 3 is a diagrammatic representation of the regulation of the brush position relative to one of the phases of the commutating motor;

Fig. 4 is a diagram of connections of a cascade group showing the arrangements for starting and braking in accordance with the invention.

Now referring to the accompany drawings, Fig. 1 shows the ordinary general, well known, arrangement of a cascade group comprising an asynchronous motor C and a series commutating motor E. $s$ represents the stator, $r$ the rotor, $b$ the rings of the principal asynchronous motor C, $m$ the stator windings, $t$ the rotor and $a_1$, $a_2$, $a_3$, the brushes of the commutating motor E mounted on the same shaft as the principal motor C.

Fig. 1 shows a variable inductance which, according to the invention, is shunted across the brushes thus interconnecting the points of Fig. 1 indicated by the same letters $a^1$, $a_2$, $a_3$.

Fig. 2 is a diagrammatic arrangement of the improved group according to the invention.

The rotor $r$ of the asynchronous three phase motor is wound in three separate phases. The commutating motor E has two sets of adjustable brushes $A_1$, $A_2$, $A_3$, and $B_1$, $B_2$, $B_3$.

The three phase shunt inductance is shown in Fig. 2 and the terminals of this inductance are connected to points indicated by the same letters.

Fig. 3 is a diagrammatic representation of one of the phases of the collector motor showing the particular arrangement employed for regulating the position of the brushes.

Fig. 4 shows a diagram of connections for starting and braking.

In this figure the same letters indicate the same members as in Figs. 1 and 2.

Further Fig. 4 shows the variable inductance $d$ connected in shunt between the two series of brushes A and B; the starting resistance L of the principal motor; a switch I enabling the rotor $r$ of the asynchronous motor to be closed on the starting rheostat L; a switch K moving in two directions, which, in the position $o$ produces the coupling in cascade of the commutating motor with the asynchronous motor, and in the position $p$ making the connections for the electric braking of the group by closing the commutating motor on the starting rheostat.

1. *Regulating the no-load speed.*—The invention allows the group in cascade to have by means of a variable inductance shunted between the brushes a no-load speed which is adjustable at will between the synchronous speed of the principal motor and the synchronous speed of the cascade group.

The use of a shunt inductance on the brushes of a commutating motor with a view to obtaining a good, no-load speed is known, but its application to a group in cascade with a series motor is new and gives this group a simple means of regulating the no load speed, independently of the property of a variable slip which it further possesses.

It may be shown that when an inductance is connected in shunt across the terminals of a series commutating motor the no load speed is limited. In fact it can be shown that the impedance of the machine becomes infinite when its slip above synchronous speed is equal to the ratio of the shunt inductance to the rotor inductance, that is to say, that the slip is limited to the value:

$$g_c = \frac{\text{shunt inductance}}{\text{rotor inductance}}.$$

There is however a connection between the slip $g_a$ of the principal asynchronous motor and the slip $g_c$ of the commutating motor. Let $p_a$ and $p_c$ be the number of pairs of poles of the asynchronous motor and of the commutating motor, then we have:

$$g_a = \frac{p_c}{(1+g_c)p_a + p_c}$$

This relation shows that if $g_c$ is limited it will be the same for $g_a$. The result is that for each value of the inductance shunted between the brushes, the group has a given speed and the variation of this speed is obtained by varying the inductance, the adjustment of the latter being obtained by one of the known means such as the variation of the number of coils, modification of the air gap and the like.

The invention further provides for the optional combination of the movement for regulating this inductance with the movement for the displacement of the brushes, in such a way that by a single operation the desired regulation and characteristics of speed are obtained.

It is well understood that when the rotor of the commutating motor is fed by the intermediary of a transformer, the variation of the inductance of the latter may be utilized for regulating the no load speed as is done sometimes with ordinary series commutating motors.

2. *Simultaneous regulation of the power factor and speed.*—In order, to maintain a good power factor under load, in spite of the variation in speed, the method according to this invention is based on the following considerations:

A polyphase series commutating motor is equivalent to a simple impedance formed of a resistance and a reactance. By suitably dimensioning the machine the desired ratio between the reactance and the resistance is obtained; in particular the dimensioning must be such that the resistance is positive and the reactance negative. Owing to this the motor will be capable under given conditions of working with a high power factor which might even be equal to unity.

If however, for the same couple it is desired to modify the speed according to the ordinary means, the resistance is varied by displacing the brushes, at the same time the reactance will also be varied and its variation will not generally be that required to retain the same high power factor under the new conditions.

For this new arrangement it is necessary in principle to influence the constants of the motor, for example to change the number of turns of the stator winding or that of the rotor. This is one of the objects of the invention; various practical means for obtaining this result are well known for example transformers having a variable ratio, double sets of brushes on the commutator, auxiliary collectors on the stator, and the like. These known means however would render necessary a second operation acting simultaneously with the brush displacement which is a complication. To avoid this double operation the invention provides in combination with a suitable dimensioning of the group, a particular means as follows; the rotor of the principal asynchronous motor is wound with three separate phases ending at six rings such as $b$. The two rings joined to the two ends of each phase are connected to one phase of the commutating motor which comprises a winding $m$ on the stator and a variable fraction of the winding of the rotor, that is to say the current of this phase (Fig. 3) after having traversed the stator $m$ traverses a variable arc AB of the winding of the rotor by two brushes placed on its commutator.

The machine may be dimensioned in such a way that, for the phase in question, one of the two brushes, for example the brush A, remains fixed whilst the other brush B only is displaced from B to B′, and the desired result is obtained in this way, approximately, that is to say by a simple displacement of one of the sets of brushes there will be obtained at each instant the resistance and the reactance of the commutating motor in a suitable proportion ensuring at speeds below synchronism of the asynchronous motor and for a given load, a high power factor.

*3. Starting and braking (Fig. 4).—*
Starting is effected by closing a switch I and then operating the rheostat L. When the group has reached a certain speed, the switch K is closed in the position $o$ which connects the commutating motor in parallel with the starting rheostat and then the switch I is opened. At this moment the connections are complete and the speed is regulated at will by means of the inductance $d$ and displacement of the brushes.

In order to obtain a rapid stoppage of the group by electric braking, the inductance is progressively brought to its minimum value and then the feed circuit is opened and the reversing switch K is placed in the position $p$. By a suitable displacement of the brushes the group is braked by causing in this way the commutating motor to act as generator on the rheostat L.

I declare that what we claim is:—

1. An alternating current motor group comprising an asynchronous motor, a series commutating motor connected in cascade therewith, means to regulate the no load speed of said group, and means to modify the transformation ratio of said commutating motor to obtain a high power factor at all loads.

2. An alternating current motor group comprising an asynchronous motor, a series commutating motor connected in cascade therewith, means to regulate the no load speed of said group and means to modify the transformation ratio of said commutating motor to obtain a high power factor at all loads and means for the starting and electric braking of said group.

3. An alternating current motor group comprising an asynchronous motor, a series commutating motor connected in cascade therewith, two sets of brushes on said commutator a variable inductance in shunt across the brushes of said commutating motor and means to modify the transformation ratio of said commutating motor.

4. An alternating current motor group comprising an asynchronous motor, a series commutating motor connected in cascade therewith, two sets of brushes on said commutator one set fixed and the other movable and adapted to vary the ratio of transformation of said commutating motor, and a variable inductance in shunt across said sets of brushes.

5. An alternating current motor group comprising an asynchronous motor, a series commutating motor connected in cascade therewith, two sets of brushes on said commutator one set fixed and the other movable and adapted to vary the ratio of transformation of said commutating motor, a variable inductance in shunt across said sets of brushes, and means to start and brake electrically said asynchronous motor.

6. An alternating current motor group comprising a three phase asynchronous motor having three separate phase windings connected at each end to a slip ring, a series commutating motor connected in cascade therewith, two sets of brushes on said commutator one set fixed and the other movable and adapted to vary the ratio of transformation of said commutating motor, a variable inductance in shunt across said sets of brushes, and means to start and brake electrically said asynchronous motor.

7. An alternating current motor group comprising a three phase asynchronous motor having three separate phase windings connected at each end to a slip ring, a series commutating motor connected in cascade therewith, two sets of relatively movable brushes on said commutator a variable inductance in shunt across said sets of brushes, a starting circuit for said asynchronous motor in parallel with said commutating motor circuit, including a rheostat and a switch and means to brake said motor group electrically.

8. An alternating current motor group comprising a three phase asynchronous motor having three separate phase windings connected at each end to a slip ring, a series commutating motor connected in cascade therewith, two sets of relatively movable brushes on said commutator a variable inductance in shunt across said sets of brushes, a starting circuit for said asynchronous motor in parallel with said commutating motor circuit including a rheostat and a switch, and a two way receiving switch adapted to connect said commutating motor circuit with said asynchronous motor circuit or to break said latter circuit and to connect said commutating motor in shunt across said rheostat.

In witness whereof, we have hereunto signed our names this 24th day of Decr., 1921, in the presence of two subscribing witnesses.

JOSEPH PERRET.
LÉON OTS.

Witnesses:
 ALPHONSE MÉJEAN,
 J. McLACHLAN.